US012759801B2

(12) United States Patent
Wallace et al.

(10) Patent No.: US 12,759,801 B2
(45) Date of Patent: Oct. 13, 2026

(54) SENSOR FOR FABRIC- OR TEXTILE-BASED CONVEYOR BELT SCANNING AND MONITORING

(71) Applicant: CONTITECH TRANSPORTBANDSYSTEME GMBH, Hannover (DE)

(72) Inventors: Jack Bruce Wallace, Powell, OH (US); Michael John Alport, Salt Rock (ZA); Jacques Frederick Basson, Durban (ZA); Thavashen Padayachee, Asherville (ZA)

( * ) Notice: Subject to any disclaimer, the term of this patent is extended or adjusted under 35 U.S.C. 154(b) by 266 days.

(21) Appl. No.: 17/309,288

(22) PCT Filed: Nov. 15, 2019

(86) PCT No.: PCT/EP2019/081495
§ 371 (c)(1),
(2) Date: May 14, 2021

(87) PCT Pub. No.: WO2020/099639
PCT Pub. Date: May 22, 2020

(65) Prior Publication Data
US 2022/0009721 A1 Jan. 13, 2022

Related U.S. Application Data

(60) Provisional application No. 62/768,179, filed on Nov. 16, 2018.

(51) Int. Cl.
*B65G 43/02* (2006.01)
*B65G 15/34* (2006.01)
(Continued)

(52) U.S. Cl.
CPC ............ *B65G 43/02* (2013.01); *G01N 22/02* (2013.01); *G06Q 10/20* (2013.01); *B65G 15/34* (2013.01)

(58) Field of Classification Search
CPC ........ B65G 43/02; B65G 15/34; G01N 22/02; G06Q 10/20
See application file for complete search history.

(56) References Cited

U.S. PATENT DOCUMENTS 6,025,814 A * 2/2000 Nelson ................ H01Q 17/001 343/890
6,291,991 B1 * 9/2001 Schnell ................. B65G 43/02 198/810.02
(Continued)

FOREIGN PATENT DOCUMENTS

DE 102007055423 A1 * 5/2009 ............ G01N 27/20
WO WO-2008070678 A2 * 6/2008 ............ B65G 43/00
(Continued)

OTHER PUBLICATIONS

"Christopher Torrence and Gilbert P. Compo, "A Practical Guide to Wavelet Analysis", No. 1, Jan. 1998, Bulletin of the American Meteorological Society vol. 79" (Year: 1998).*
(Continued)

*Primary Examiner* — Gene O Crawford
*Assistant Examiner* — Abby A Jorgensen
(74) *Attorney, Agent, or Firm* — Iken Sans; Richard A. Wolf; Gregory Adams

(57) ABSTRACT

A system for monitoring conveyor belts is disclosed. The system also includes a first sensor configured to generate a first field and obtain first measurements based on the generated first field and a conveyor belt. The system also includes a second sensor configured to generate a second field and obtain second measurements based on the generated second field and the conveyor belt. The system also
(Continued)

400 includes circuitry configured to generate hybrid belt information based on the obtained first measurements and the obtained second measurements. The system can utilize the Doppler effect and/or microwave radiation/fields to generate the hybrid belt information.

18 Claims, 8 Drawing Sheets

(51) Int. Cl.

| | |
|---|---|
| ***G01N 22/02*** | (2006.01) |
| ***G06Q 10/20*** | (2023.01) |

(56) References Cited

U.S. PATENT DOCUMENTS

| | | | | |
|---|---|---|---|---|
| 6,356,201 | B1 * | 3/2002 | Alles | B65G 43/02<br>342/51 |
| 12,595,134 | B2 * | 4/2026 | Wallace | B65G 43/02 |
| 2004/0173440 | A1 * | 9/2004 | Mauch | B65G 43/10<br>198/781.05 |
| 2013/0136816 | A1 * | 5/2013 | Kuesel | G01N 23/18<br>425/29 |
| 2015/0151922 | A1 * | 6/2015 | Wallace | H01B 3/28<br>198/502.1 |
| 2017/0305682 | A1 * | 10/2017 | Wallace | B65G 15/36 |

FOREIGN PATENT DOCUMENTS

| | | | | |
|---|---|---|---|---|
| WO | WO-2008090521 | A1 * | 7/2008 | B65G 43/02 |
| WO | WO-2008090523 | A1 * | 7/2008 | B65G 43/02 |
| WO | WO-2017150508 | A1 * | 9/2017 | B65G 43/02 |

OTHER PUBLICATIONS

International Search Report dated Mar. 20, 2020 of International Application PCT/EP2019/081495 on which this application is based.

Y. Pang et al. / A Novel Embedded Conductive Detection System for Intelligent Conveyor Belt Monitoring 2006.

* cited by examiner

500

SENSOR FOR FABRIC- OR TEXTILE-BASED CONVEYOR BELT SCANNING AND MONITORING

FIELD

Conveyor belts can be subject to harsh conditions. As a result, the belts can degrade and or fail due to tears and the like.

BACKGROUND

Conveyor belts and can be subject to harsh conditions. As a result, the belts can degrade and or fail due to tears and the like.

What is needed are techniques to scan and/or monitor conveyor belts and identify or detect belt degradation prior to belt failure. Furthermore, techniques are needed that monitor conveyor belts safely.

DETAILED DESCRIPTION

Figure 1:
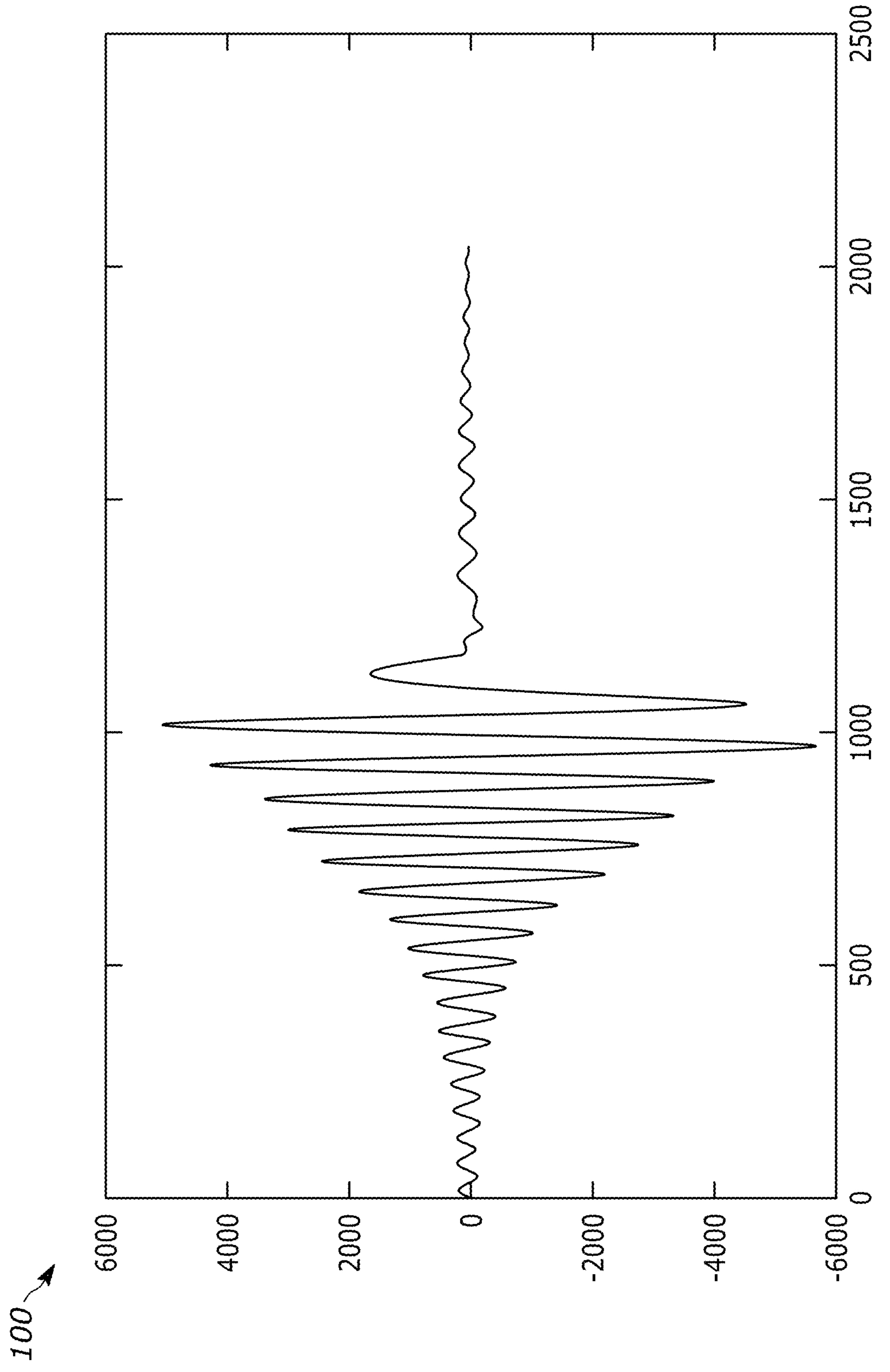
FIG. 1 is a graph illustrating a signal received from a reflector in accordance with one or more embodiments

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

It is appreciated that (fabric) belt monitoring using various sensor technologies is possible. However, there are a range of potential safety, reliability, dimensional, cost and the like issues that can prevent or mitigate use of sensor based belt monitoring.

Embodiments according to the disclosure involve condition monitoring of fabric/textile reinforced rubber products, such as conveyor belting, which are used in harsh applications and are subject to damage events. If these damage events are critical in nature or become progressively worse, the rubber product could suffer from a catastrophic event, by either developing a longitudinal rip or a transverse tear. This may lead to shut down operations or even lead to lengthy downtime issues as the damaged rubber product is repaired or replaced, and/or the system cleaned and repaired in order to resume operation. Furthermore, if damages in fabric or textile reinforced rubber product become severe, then the integrity of the load carrying medium can be compromised and ultimately leads to complete failure if timely maintenance is not scheduled. These damages could either be in the rubber itself, or if severe enough, also in the fabric or textile reinforcement as well.

Additionally, it is appreciated that conveyer belt damage and/or degradation is important to mining conveyor belt systems. The embodiments can provide the ability to detect and react to sources of belt degradation can extend the life of the belt and enhance operation of mining conveyor belt systems. Further, knowledge of the conveyer belt condition or degradation permits mines or mining operations to plan/schedule belt replacements at selected times that facilitate productivity and efficiency of the mining process. For example, known degradation can permit a system to schedule replacement during low volume or down times of a conveyor belt system. Further, the embodiments can provide determination of belt structure using reflective time of flight measurements as well as defect characterization using reflective time of flight and doppler frequency shifts. The embodiments can, for example, determine cover gauges, detect carcass delamination, identify damage events caused by impact or conveyor accessor or structural interactions.

In some aspects, scanning or monitoring conveyor belts to detect, monitor and alarm when hazardous conditions arise can prevent the catastrophic events described above. According to the disclosure, a sensor system detects, assesses and/or monitor changes to damage events and their risk to the integrity of the conveyor belt via either periodic scans or permanently-mounted conveyor scans. Also, by expanding the system to monitor for splice integrity and longitudinal rips in the permanently mounted systems, the sensor system could further limit damage to the conveyor belt and system by detecting splice failures before they happen and by limiting longitudinal rips in the system due to damage to dielectric elements embedded in the conveyor belt.

In some aspects of the disclosure, the solution to the problem of determining the integrity of a fabric or textile reinforced belt, both through scanning or via continuous monitoring, involves the use of microwave technology, specifically by utilizing the Doppler effect with microwave-based sensor technology. With this technology, defects in the conveyor belt will be detected, imaged and presented to an operator in an intuitive manner for proper interpretation of the damage.

Some embodiments according to the disclosure include a single scan approach, where a method of monitoring fabric or textile reinforced conveyor belts, includes a conveyor belt having a fabric or textile reinforced structural component with dielectric properties, and which is coated on both sides with a rubber or polymer surface. Also used are a field generator and sensor component that receives data over a single revolution of the conveyor belt in order to determine the condition of the fabric or textile reinforced conveyor belt's cover or carcass.

Some other embodiments according to the disclosure include portable scans of the same belt at different times and comparing data sets. Here, the conveyor belts include a fabric or textile reinforced structural component having dielectric properties and coated on both sides with a rubber or polymer surface, which are monitored with a device having a field generator, and sensor component that receives data over a single revolution of the conveyor belt in order to determine the condition of the conveyor belts cover or carcass, and the ability to compare data with an earlier data set with the purpose of determining changes within the belt over time.

Yet other embodiments according to the disclosure include a permanent system monitoring for damage. In these cases, the conveyor belt includes a fabric or textile reinforced structural component having dielectric properties and coated on both sides with a rubber or polymer surface. The conveyor belt is monitored with a device including a field generator, a sensor component that continually receives data from the sensor, and has a means of comparing current data with a stored data map of one revolution of the belt in order to determine changes in condition of the fabric conveyor belt's cover or carcass in real-time.

In some other aspects, system functionality may be expanded to perform rip detection and/or splice monitoring. Accordingly, rip detection and/or splice monitoring may employ the use inserts designed to change reflective nature based on longitudinal damage of inserted material. This could simply be a conductive element such as a strip or potentially a conductive element in the fabric weave. Consistent with this approach, some embodiments a methods of monitoring fabric conveyor belts, where the conveyor belt comprises a fabric or textile reinforced structural component having dielectric properties and coated on both sides with a rubber or polymer surface. Monitoring is conducted with a device including a field generator, and sensor component that continually receives data from the sensor and has capability of comparing current data with a stored data map of one revolution of the belt in order to detect longitudinal anomalies in the map that correlate to longitudinal grooving of the belt or longitudinal rips of the carcass in real-time, and an alarm to limit the damage associated with these events.

Yet other embodiments are splice monitoring. Here, the conveyor belt includes a fabric or textile reinforced structural component having dielectric properties and coated on both sides with a rubber or polymer surface. The monitoring is conducted with a device including a field generator, and sensor component that continually receives data from the sensor and has a capability of comparing current data with a stored data map of one revolution of the belt in order to detect changes to the conveyor belt splices and alarm when splice changes exceed a set threshold value. In some aspects, splice monitoring may include radar-reflective inserts to characterize splice edges and angles for splice monitoring analysis.

Some advantages that can be provided by embodiments of the disclosure include, but are not limited to, less susceptibility to material contamination due to the fact that a defect that is perpendicular to the belt surface is required, less prone to false alarms due to damage surface requirement, the technology could be utilized for both permanent or scanning applications, an image-based system provides the end user the ability to understand reporting, and affordability.

One example of a doppler technique used in some embodiments of the disclosure involves placing a microwave transceiver ~50 mm above the belt surface and angled at ~45° to the belt. The microwave frequency can be in the range of 1-100 Ghz, but typically one of the industrially accepted bands such as 10 GHz, 24 GHz or 77 GHz can be used. Damages in the belt act like moving objects and produce a partial reflection of the incident microwave beam. In application, the moving objects are damages in either or both of the rubber or the reinforcing material (i.e. the fabric, textile or steel cords). The frequency of this reflected wave will either be lower than the incident wave if the belt is moving away from the transceiver or higher if the belt is moving towards the transceiver. Thus, when the object is moving towards the sensor, the frequency of the reflected wave is given by:

$$f = f_\mu + f_D \tag{I}$$

where $f_\mu$ is the microwave frequency, and the Doppler frequency is given by:

$$f_D = \left(\frac{2|\vec{v}|\cos\theta}{c}\right) f_\mu \tag{II}$$

Here $|\vec{v}|$ is the actual velocity of the object and θ is the angle between the object's velocity and the line of sight $|\vec{v}|$ is multiplied by cos θ to give the component of the velocity along the line of sight. This allows for the general situation where the object is not moving directly towards the transmitter. When the object is moving away from the transmitter, the received frequency is given by:

$$f = f_\mu - f_D \tag{III}$$

In practice, the received signal is mixed (multiplied) with the transmitted signal which gives a resultant (the intermediate frequency or IF) which is the superposition of two oscillations having frequencies:

$$f_1=f_\mu+(f_\mu+f_D)=2f_\mu+f_D \text{ and} \tag{IV}$$

$$f_2=f_\mu-(f_\mu+f_D)=f_D \tag{V}$$

The signal at the frequency of $f_1$ is easily removed using a low-pass filter leaving just the low frequency oscillation at the Doppler frequency $f_D$. For example, for a belt moving at 10 m/s, the maximum value of will be 2×10 m/s×10.521 GHz/(3×$10^8$ m/s) ~700 Hz. This frequency will be reduced by the factor cos θ which will be 0.707 for a typical value of θ=45°.

The Doppler techniques used in accordance with the disclosure generally use a radiation source having a fixed frequency. This is in contrast to other similar techniques such a Synthetic Aperture Radar (SAR) where the microwave frequency is swept and the analysis of the return signal gives information about the range of the moving object. This range information is not required in the current application since it is known that there can only be reflection from a limited region of the belt that is defined by the shape of the antenna pattern. There is thus no need to implement the more complicated arrangement of sweeping the microwave frequency.

Generally, the Doppler phenomenon describes what happens when any source of radiation is transmitted towards a moving object. Although in the current embodiment, the radiation source is a microwave transmitter the same technique could be used with electromagnetic radiation having a frequency higher or lower than that of microwaves. Furthermore, the same technique could be implemented using ultrasonic transducers (i.e. sound waves).

Although a single microwave transceiver could be mounted above the moving conveyor belt, the Doppler shifted signal is difficult to interpret as a single set time-series of data points. The damages in the conveyor belt are more easily identified and analyzed if the data is presented as an image. This is achieved by placing a number of microwave transceivers across the belt. The intermediate frequency outputs from each of these sensors form data streams that are then stacked vertically to form the rows of an image. In this way the columns of pixels in the image display the time varying output of the array of sensors.

These images may be displayed as a greyscale image where the brightness of the pixels is proportional to the amplitude of the sensor output. Alternatively, the image may be displayed as a pseudo-color image where different colors are mapped to the different signal amplitudes.

The antenna pattern of each transceiver determines the field of view of each sensor and hence the portion of belt that is being imaged. This antenna pattern could be as large as 80° or as narrow as 12° depending on the configuration and orientation of the patch antenna on the sensor. Typically, the antenna of the transceiver is oriented so that the antenna pattern is narrow along the length of the belt and wider along its width. In this way, reflections are received only from a small region along the length of the belt. Since the line of sight velocity doesn't change much, the Doppler frequency is fairly well defined.

Although the sensors could be placed across the belt with any spacing, typically the pitch would be about equal to the width of the sensor itself, which is ~25 mm for 24 Ghz sensors.

Generally, all the sensors in the array are not transmitting at the same time since then the reflected signal from adjacent transmitters will mix with the signal with the current one and so produce a spurious IF signal. For this reason, the sensors are powered up sequentially, making sure that the signal reaches a steady state before its output is sampled by the A/D converter. That sensor is then switched off, before the next sensor in the array is powered up.

The IF output from the sensor has a relatively small amplitude of ~10 mV. This can easily be amplified by an op amp circuit before the signal is digitized by an A/D converter. This Doppler-shifted signal can be clearly seen by fixing a reflector angle of aluminum on the belt. This reflector has the property that it reflects microwaves back in the direction of the incident wave.

It is appreciated that belt structure and defect detection can be obtained without safety concerns associated with high energy devices, such as high energy x-ray devices.

FIG. 1 is a graph 100 illustrating a signal received from a reflector in accordance with one or more embodiments.

The signal received from the reflector is shown in FIG. 1. The received signal begins to increase in amplitude at t~0 as the reflector approaches the antenna. Since the antenna has a 3 dB halfwidth in the vertical plane of 20°, it is first detected at ~100 mm from the sensor position. As the reflector approaches, the signal amplitude increases exponentially until at t~1000, it then decreases again to zero as the detector passes. It is not very clear from this figure that the signal frequency (period) is initially constant, but then begins to decrease (increase) as the target gets close. This is more clearly seen by plotting the period of each of the oscillations as a function of time as shown in FIG. 2.

Figure 2:
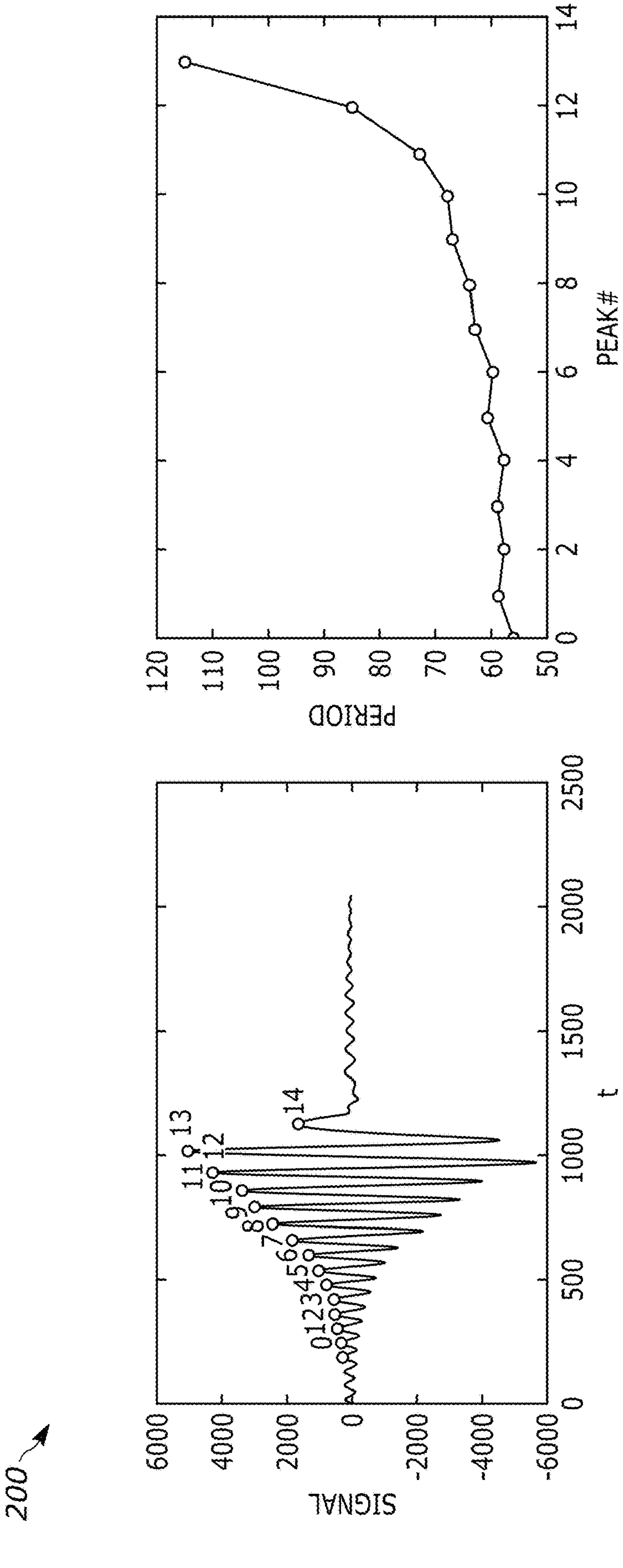
FIG. 2 is a graph illustrating oscillations as a function of time in accordance with one or more embodiments

FIG. 2 is a graph 200 illustrating oscillations as a function of time in accordance with one or more embodiments.

A left portion of the graph 200 depicts signal magnitude along a y-axis and time along an x-axis. A right portion of the graph 200 depicts periods along a y-axis and peaks along an x-axis.

As shown in FIG. 2, the doppler signal received from the reflector after it has been mixed with the transmitted signal, and the dots are the times of occurrence of the peaks which are plotted in the panel on the RHS. As the reflector approaches, the period increases slowly then at about peak #11, the period increases rapidly and hence the corresponding frequency decreases.

The increase in the period of the oscillations may be understood by noting that the frequency of the reflected wave depends on the component of the velocity along the line-of-sight, and is given in Equation (I) above. When the object is far away, θ≈0 and cos θ=1, and the frequency is maximum. As θ increases, the frequency decreases and the wave period increases. The amplitude of the reflected wave also increases since the object is moving closer to the antenna. Finally, as the reflecting object passes out of the field of view of the sensor, the reflected wave decreases in amplitude.

The Doppler oscillations can be removed by applying a wavelet transform (as disclosed in "A Practical Guide to Wavelet Analysis", Christopher Torrence and Gilbert P. Compo, Bulletin of the American Meteorological Society Vol. 79, No. 1, January 1998, included herein in its entirety by reference) to the output of the sensor. Although there are a number of possible wavelet basis functions that can be used, such as Paul or Mexican hat, it is appreciated that the Morlet wavelet gives the best and/or superior results. The Morlet function consists of a plane wave modulated by a Gaussian:

$$\psi(\eta)=\pi^{-1/4}\exp i(\omega_0\eta)\exp(-\eta^2/2) \quad \text{(VI)}$$

Figure 3:
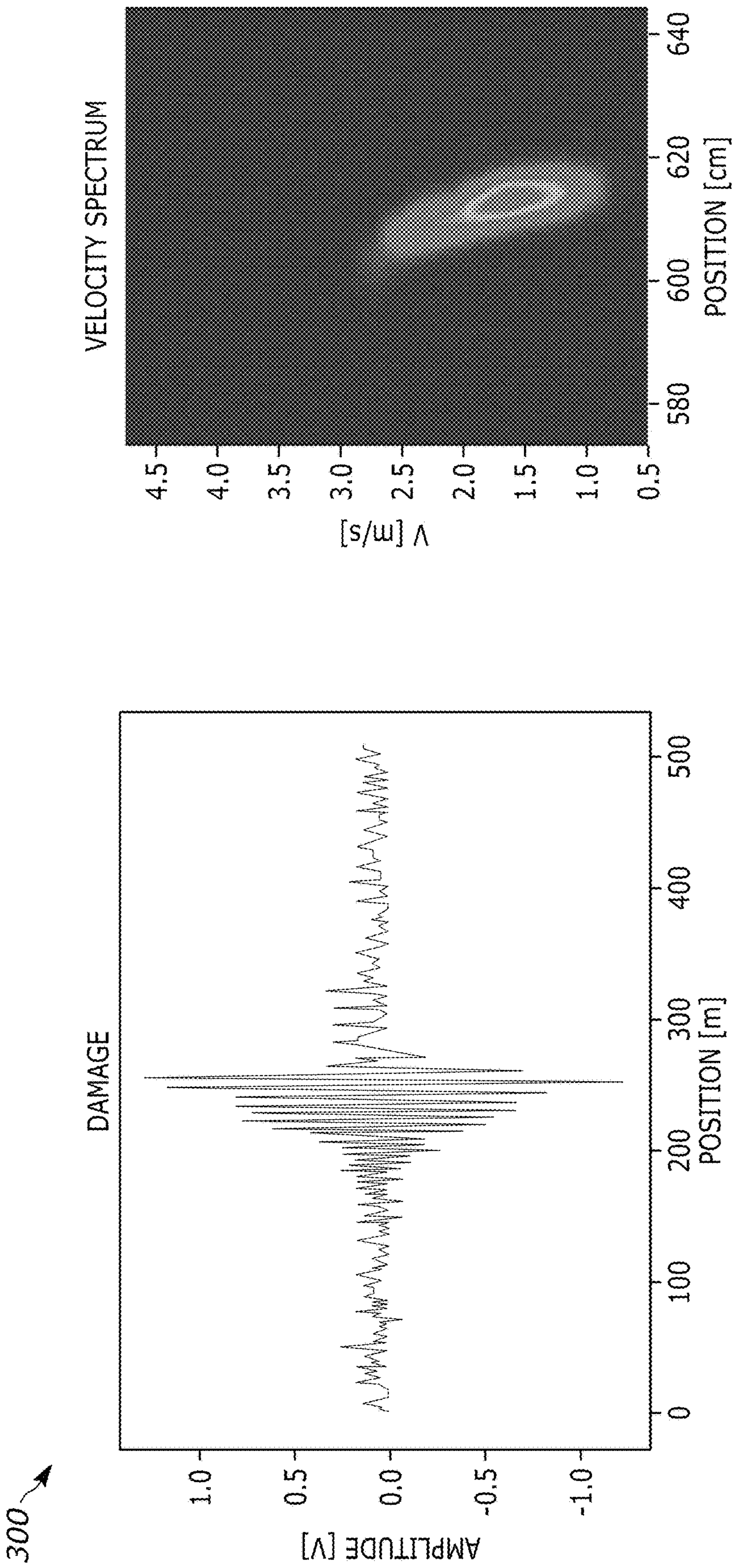
FIG. 3 is another graph in accordance with one or more embodiments

FIG. 3 is another graph 300 in accordance with one or more embodiments.

Now referring to FIG. 3, which shows a raw signal obtained from the sensor on the left, and on the right, the signal after being processed by the Morlet filter As shown on the right, the velocity varies between 1 and 2 m/s due to the variation of θ as the damage approaches the sensor. The finite extent of the vertical antenna pattern causes the spectrum to peak at v~1.5 m/s.

In some aspects of the disclosure, it is possible to generate an image of the full belt by accumulating the raw outputs from the sensors into an array where the rows correspond to the time varying output voltage of the individual sensors that are placed across the belt. The belt itself has two splices and a number of damages as shown in the belt schematic in FIG. 4.

Figure 4:
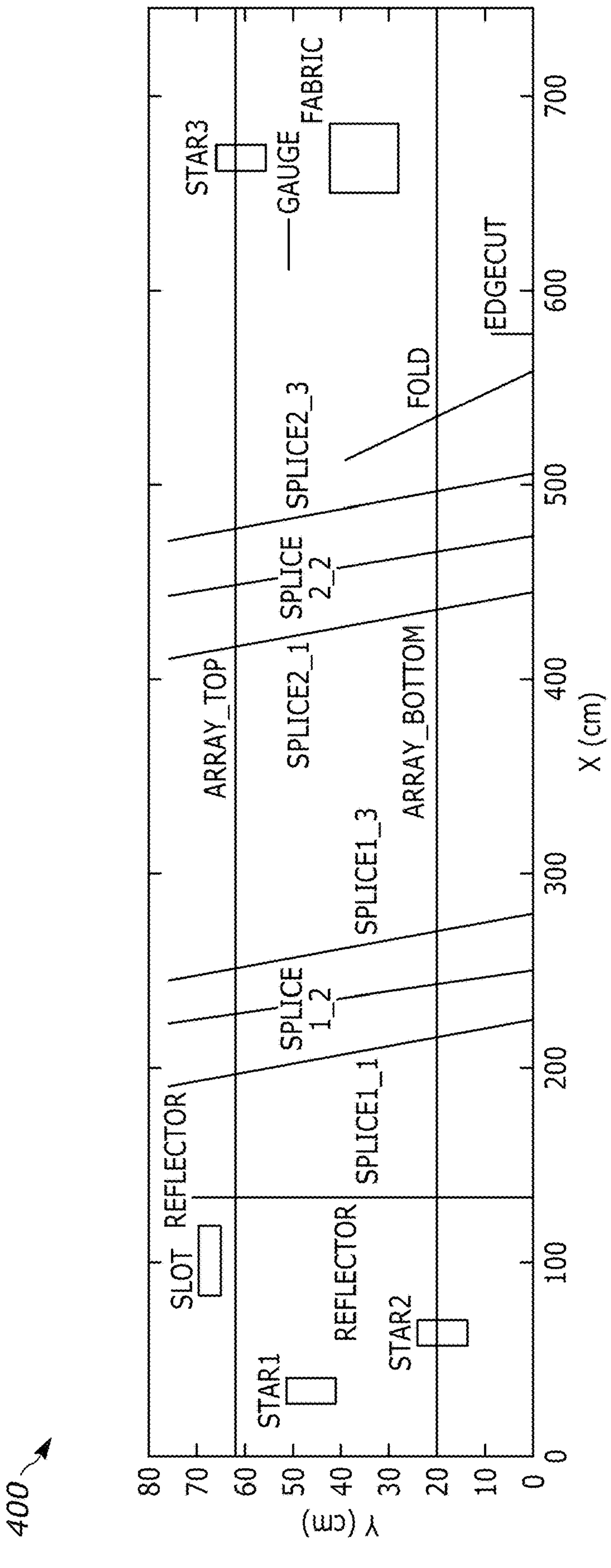
FIG. 4 is another graph in accordance with one or more embodiments

FIG. 4 is another graph 400 in accordance with one or more embodiments.

Figure 5:
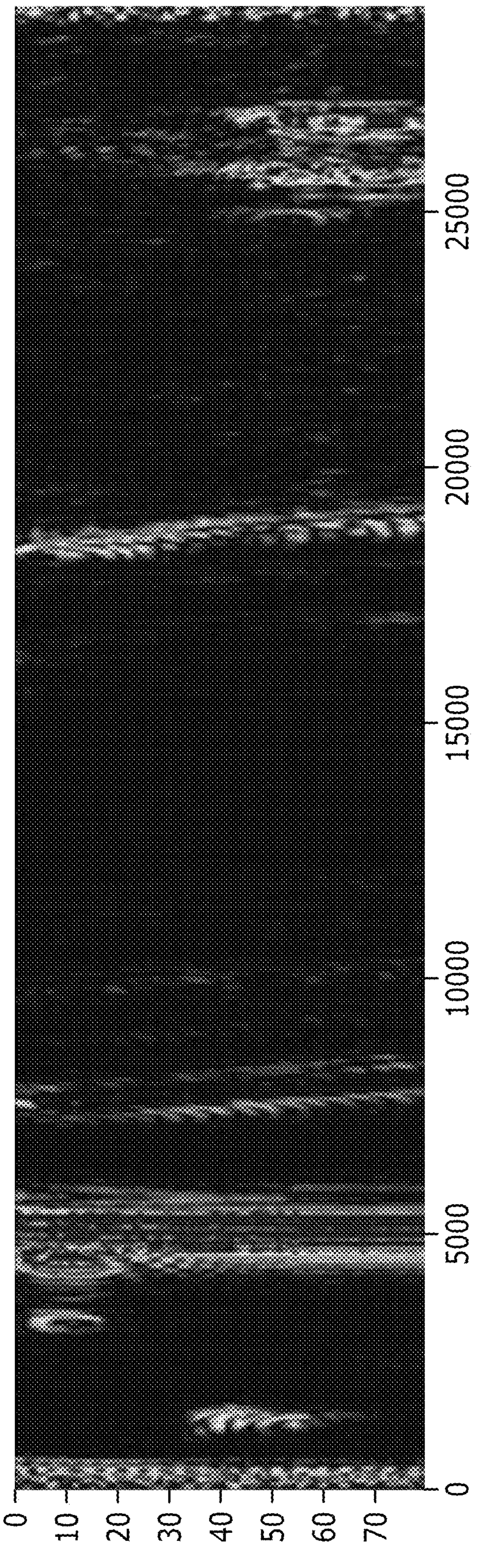
FIG. 5 is an image of the full belt of FIG. 4 in accordance with one or more embodiments

FIG. 5 is an image 500 of the full belt of FIG. 4 in accordance with one or more embodiments.

The Doppler image of the full belt in FIG. 4 is shown in FIG. 5. This raw image is a little confused since the oscillations from the Doppler reflection make it difficult to identify the individual damages and splices. Again, the Morlet filter can be used to filter out these oscillations as shown in FIG. 6, which better shows corresponding elements and damage of the belt schematic of FIG. 4.

Figure 6:
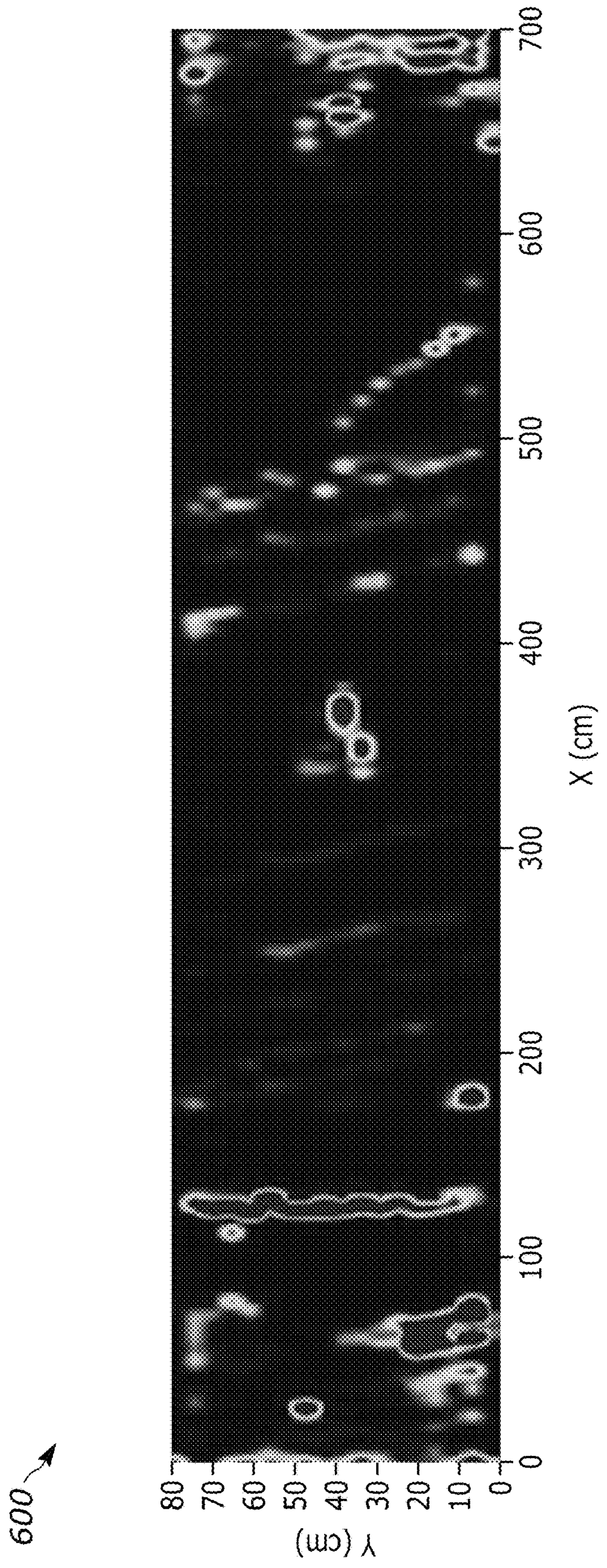
FIG. 6 is another graph in accordance with one or more embodiments

FIG. 6 is another graph 600 in accordance with one or more embodiments.

In another aspect of the disclosure, for typical conveyor belt thicknesses of 2-4 cm, the microwaves are only slightly attenuated when they pass through the belt. Based on this, the Doppler imaging technique can be used to show surface damages that are either on the top (i.e. the same side as the sensors) or the bottom (i.e. the side opposite to the sensors).

In some embodiments, a radome or cover is mounted over the sensor antennas to protect them from environmental influence. The material and dimensions of the radome material are optimally chosen and designed. The thickness, Tm of the radome may be $\lambda_m/2=\lambda_0/\sqrt{\epsilon_r}$ where $\lambda_m$ is the wavelength in the material, λ0 is the free space wavelength, and ϵr is the relative permittivity. In one nonlimiting example, for polycarbonate which has ϵr=2.9, and Tm=3.6 mm at 24.125 GHz, the distance between the surface of the radome and the antenna needs to be half a wavelength, which is the free-space wavelength T0=λ0/2=6.2 mm.

Figure 7:
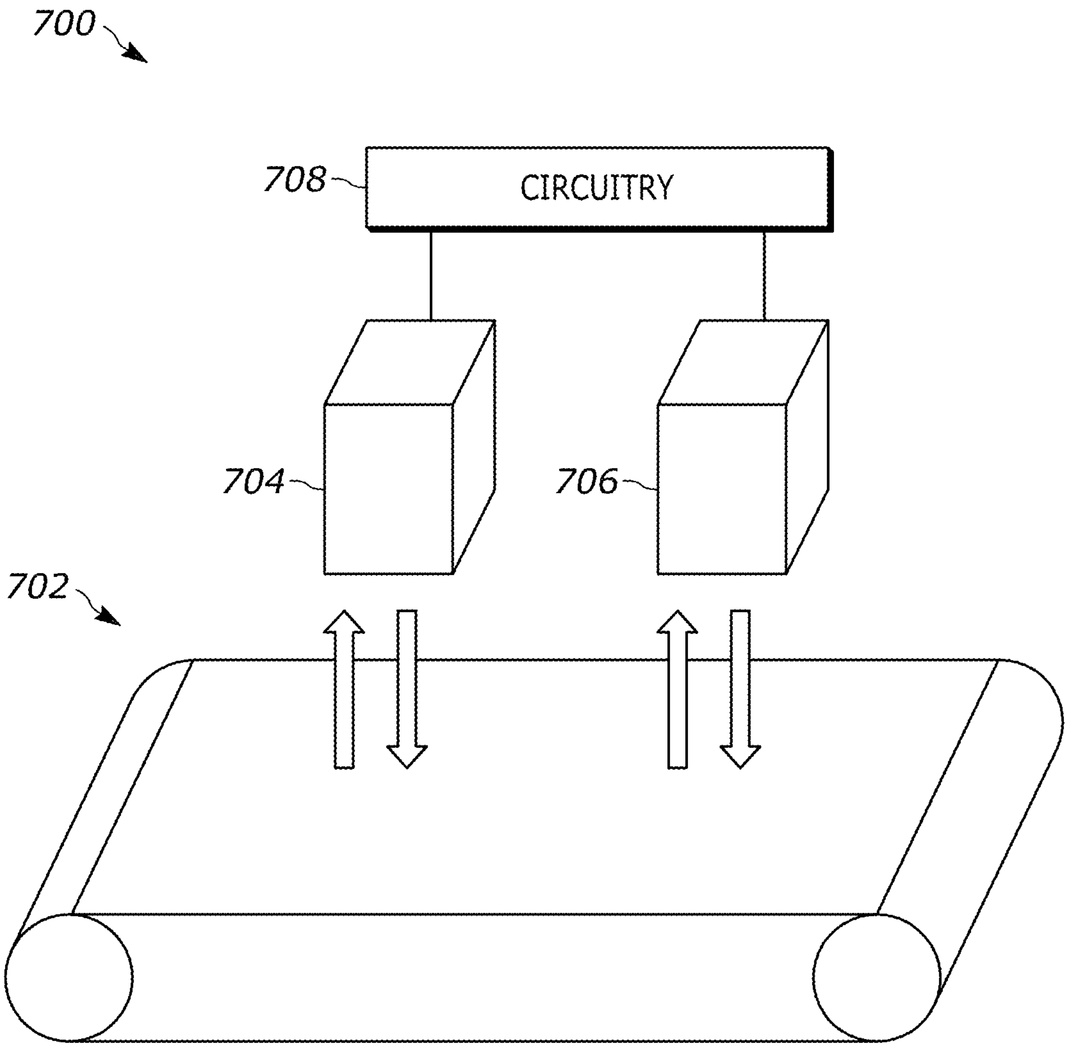
FIG. 7 is a diagram illustrating a hybrid system for scanning a conveyor belt in accordance with one or more embodiments

FIG. 7 is a diagram illustrating a hybrid system 700 for scanning a conveyor belt in accordance with one or more embodiments. The system 700 is provided for illustrative purposes and it is appreciated that suitable variations are contemplated.

The system 700 utilizes a microwave technique and a doppler technique to identify degradation and the like in a conveyor belt.

The system 700 includes a doppler sensor 704 and a microwave/radiation sensor 706 that operate on conveyor belt 702.

The conveyor belt 702 can be a composite of fabric, elastomeric material and the like. The belt 702 can have one or more splices.

The doppler sensor 704 includes an array of transmitters/field generators and an array of receivers. The doppler sensor 704 can operate as described above. The sensor 704 generates doppler signals and can determine properties of the conveyer belt. These belt properties include thickness, position, time, location and the like.

The doppler sensor 704 includes a circuitry that uses the measured belt properties that can be used to generate a map or belt map. The belt map can cover an entire portion of the belt 702. The doppler circuitry can also be configured to compare the measured belt properties with expected values, previously measured values and the like to identify belt defects. Further, the doppler circuitry can also be configured to determine expected life, determine maintenance schedules and the like.

In one example, the sensor 704 includes an array of tera-hertz transducer(s) and sensors aligned across the belt 702. A reflective wave analysis technique is used to monitor time of flight, doppler frequency shifts, intensities and the like. These can be analyzed to determine belt structure, defects, splices and the like within the conveyor belt 702. Such an array can be mounted perpendicular to the belt 702 or at a selected angle to the belt 702 to analyze characteristics/structure outside of a plane of the conveyor.

The radiation sensor 706 includes an array of transmitters and an array of receivers. The sensor 706 generates radiation signals that impact the conveyor belt 702 and then receives the emitted or generated signals. The radiation sensor includes radiation circuitry configured to determine properties of the conveyer belt based on the received signals. These belt properties include thickness, position, time, location and the like. The belt properties are also referred to as measured belt properties.

In one example, the radiation sensor 706 generates signals within microwave frequencies of between 300 MHz and 300 GHz. In another example, the sensor generates signals at microwave frequencies that exclude UHF and VHF.

The radiation circuitry can be configured to use the measured belt properties to generate a map or belt map. The belt map can cover an entire portion of the belt 702. The radiation circuitry can also be configured to compare the measured belt properties with expected values, previously measured values and the like to identify belt defects. Further, the radiation circuitry can also be configured to determine expected life, determine maintenance schedules and the like.

The generated radiation signals are typically at a fixed frequency. In one example, the frequency is within or about microwave ranges.

Hybrid circuitry is configured to utilize information from the doppler sensor 704 and the radiation sensor 706 to generate hybrid belt information or properties based on the combined information. The hybrid circuitry can be included in circuitry 708. It is also appreciated that the circuitry 708 can include the radiation circuitry and/or the doppler circuitry.

The hybrid belt information can identify belt defects, for example, that are only identified by each sensor. The hybrid belt information can include belt health, rip detection, splice monitoring and the like.

In one example, the hybrid circuitry utilizes three revolutions of the belt to generate a hybrid belt map.

In another example, the circuitry 708 is configured to analyze multiple measured belt properties over a plurality of revolutions of the belt 702. The circuitry 708 can be configured to generate a map based on measured properties of the plurality of revolutions. The circuitry 708 can compare current measured properties with the generated map and/or prior measured properties to determine the belt information, changes in belt information, determine/schedule belt service and the like.

Figure 8:
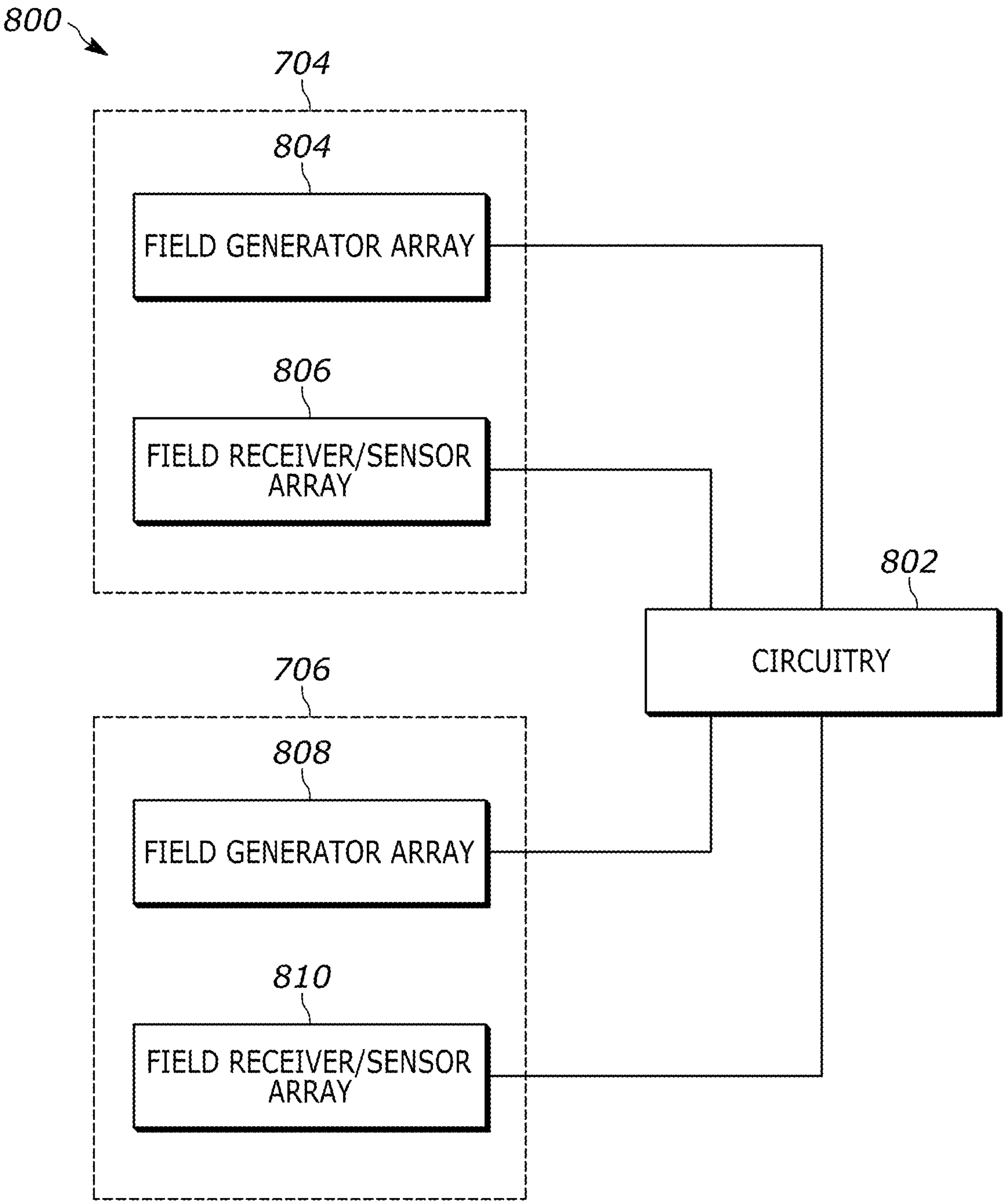
FIG. 8 is a diagram illustrating a hybrid system for scanning a conveyor belt in accordance with one or more embodiments

FIG. 8 is a diagram illustrating a hybrid system 800 for scanning a conveyor belt in accordance with one or more embodiments. The system 800 is provided for illustrative purposes and it is appreciated that suitable variations are contemplated.

The system 800 is substantially similar to the system 700 and includes additional details about circuitry 802.

The system 800 includes the circuitry 802, a doppler sensor 704 and a radiation sensor 706. The doppler sensor 704 includes a field generator array 804 and a field receiver array 806.

The radiation sensor 706 includes a field generator array 808 and a field receiver array 810.

The circuitry 802 can include and/or be part of the circuitry 708. The circuitry 802 is configured to cause the sensors 704 and 706 to generate fields and measure the generated fields. The hybrid circuitry 802 can utilize a combination of one or both of the sensors 704 and 706. Further, the hybrid circuitry 802 can utilize varying numbers of field generators and receivers for each of the sensors 704 and 706.

The hybrid circuitry 802 is configured to generate hybrid belt information that includes thickness, position, time, date and the like.

The hybrid circuitry 802 is configured to generate a hybrid belt map that can identify potential defects, splices and the like.

In addition to that described above, some embodiments of the disclosure could be utilized in conveyor belt applications that have vertical components to monitor vertical structures such as belt walls, cleats, chevrons, and the like.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

One general aspect includes a system for monitoring conveyor belts. The system also includes a first sensor configured to generate a first field and obtain first measurements based on the generated first field and a conveyor belt. The system also includes a second sensor configured to generate a second field and obtain second measurements based on the generated second field and the conveyor belt. The system also includes circuitry configured to generate hybrid belt information based on the obtained first measurements and the obtained second measurements.

Implementations may include one or more of the following features. The system where the circuitry is configured to identify one or more belt defects based on the generated hybrid belt information. The circuitry is configured to determine an expected failure time for the one or more identified belt defects. The circuitry is configured to determine a maintenance schedule to correct the identified belt defect prior to the expected failure time. The first sensor may include an array of transducers. The first sensor and the second sensor utilize microwaves and the doppler effect. One or both of the first sensor and the second sensor are perpendicular to a planar surface of the conveyor belt. One or both of the first sensor and the second sensor are not perpendicular to a planar surface of the conveyor belt. A plurality of sensors of the first sensor and/or the second sensor are arranged across the conveyor belt with a selected spacing. The selected spacing is 25 millimeters for 25 gigahertz for the plurality of sensors. The sensors are activated or operated sequentially and no more than one sensor is transmitting at the same time. The first sensor utilizes microwave-based sensor technology and the circuitry is configured to utilize the obtained first measurements and the doppler effect to at least partially determine one or more belt defects. The second sensor utilizes radiation at non-microwave frequency ranges. The circuitry is configured to generate a map of the conveyor belt based on the obtained first measurements and the obtained second measurements over a plurality of revolutions of the conveyor belt. Implementations of the described techniques may include hardware, a method or process, or computer software on a computer-accessible medium.

One general aspect includes a system for monitoring conveyor belts. The system also includes a plurality of field generators positioned at an angle of incidence to a surface of a conveyor belt and configured to generate a field. The system also includes a plurality of receivers configured to measure a reflected field based on an interaction of the field with the conveyor belt. The system also includes circuitry configured to determine belt properties of the conveyor belt based on the measured reflected field.

Implementations may include one or more of the following features. The system where the circuitry is configured to determine a doppler effect based on the measured reflected field. The plurality of field generators includes a first portion that generates first signals at a plurality of frequencies of less than 30 GHz and a second portion that generates second signals at a fixed frequency of greater than 300 MHz and less than 300 GHz. At least a portion of the plurality of receivers are positioned on an opposite side of the conveyor belt and measure signals that pass through the conveyor belt. The circuitry is configured to predict when a belt failure will occur and schedule a repair of the conveyor belt before the predicted belt failure.

One general aspect includes a method of monitoring a conveyor belt. The method of monitoring also includes generating a field using a field generator. The monitoring also includes receiving data based on interaction of the field with the conveyor belt over at least a portion of a revolution of the conveyor belt. The monitoring also includes analyzing the received data to determine and generate belt information based on the received data. Other embodiments of this aspect include corresponding computer systems, apparatus, and computer programs recorded on one or more computer storage devices, each configured to perform the actions of the methods.

Implementations may include one or more of the following features. The method may include comparing the generated belt information with a map to identify belt degradation. The method may include generating the field for detecting doppler shifts. The method may include generating a microwave field as the field. Implementations of the described techniques may include hardware, a method or process, or computer software on a computer-accessible medium.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for monitoring conveyor belts, the system comprising:

a first sensor configured to generate a first field and obtain first measurements using microwave technology and based on the generated first field and a conveyor belt;

a second sensor configured to generate a second field and obtain second measurements based on the generated second field and the conveyor belt;

circuitry configured to generate hybrid belt health information based on the obtained first measurements and the obtained second measurements and utilize the obtained first measurements and the Doppler effect to at least partially determine belt damage;

a microwave transceiver positioned above the conveyor belt and angled at 45 degrees to the belt, generates the first field as a microwave frequency at a fixed frequency and the first measurements are based on a reflected waves from an internal surface of an internal structural element er defect contained in the conveyor belt;

velocities of one or more internal structures and defects are determined based on the fixed frequency and a reflected frequency of the reflected wave and generate a doppler image of the belt with the locations of the internal structures and defects;

mapping locations of the internal structures over a single revolution of the belt;

detected locations of the internal structures and defects are compared with a prior stored belt map having splice and damage locations to determine new damage and/or changes to internal structure or damages.

2. The system of claim 1, wherein the circuitry is configured to identify one or more belt defects based on the generated hybrid belt information and to determine an expected failure time for the one or more identified belt defects.

3. The system of claim 2, wherein the circuitry is configured to determine a maintenance schedule to correct the identified belt defect prior to the expected failure time.

4. The system of claim 1, wherein the second sensor utilizes radiation at non-microwave frequency ranges.

5. The system of claim 1, wherein the first sensor comprises an array of transducers.

6. The system of claim 1, wherein the first sensor and the second sensor utilize microwaves and the Doppler effect.

7. The system claim 1, wherein the first sensor is perpendicular to a planar surface of the conveyor belt.

8. The system claim 7, wherein the second sensor is not perpendicular to a planar surface of the conveyor belt.

9. The system of claim 1, wherein a plurality of sensors of the first sensor and/or the second sensor are arranged across the conveyor belt with a selected spacing is 25 millimetres and wherein the sensors are activated or operated sequentially and no more than one sensor is transmitting at the same time.

10. The system of claim 1, wherein the circuitry is configured to generate a map of the conveyor belt based on the obtained first measurements and the obtained second measurements over a plurality of revolutions of the conveyor belt.

11. A method of monitoring a conveyor belt, wherein the conveyor belt comprises a fabric or textile reinforced structural component having dielectric properties and coated on both sides with a rubber or polymer material, the method comprising:

generating a microwave field using a field generator and the field angled at about 45 degrees to the belt;

receiving a data signal based on interaction of the field with internal structures and defects of the conveyor belt over at least a revolution of the conveyor belt, wherein the internal structures and defects are characterized using reflective time of flight and doppler frequency shifts;

analyzing the received data signal to generate a reflected image map based on the received data and showing locations of the internal structures and defects of the conveyor belt; and comparing the reflected image map with a belt map to identify belt damage.

12. The method of claim 11, further comprising filtering the received data signal with a Morlet filter.

13. The method of claim 11, wherein the internal structure includes a splice and an edgecut.

14. A system for monitoring conveyor belts which comprise a fabric or textile reinforced structural component, the system comprising:

a field generator configured to generate a field at an angle toward a conveyor belt;

a sensor that receives data over a single revolution of the conveyor belt, wherein the sensor is a microwave based sensor which is capable of monitoring reflective time of flight and doppler frequency shifts;

a plurality of fabric reinforced structural components having dielectric properties; and the sensor compares the received data with an earlier data set having portable and prior scans of the conveyor belt to determine and identify elements including the plurality of fabric reinforced structural elements and damage of the belt and determine changes within the belt over time, wherein the field generator generates the field in one of a group of frequencies including lower than microwave frequencies, microwave frequencies, higher than microwave frequencies and ultrasonic frequencies, and wherein the field generator generates the field at an angle of about 45 degrees.

15. The system of claim 14, further comprising a plurality of inserts as conductive elements within the conveyor belt and the sensor is configured to detect longitudinal rips based on the received data and the prior scans of the conveyor belt.

16. The system of claim 14, further comprising radar-reflective inserts to characterize splice edges and angles.

17. The system of claim 14, the sensor comprises a plurality of microwave transceivers across the conveyor belt and generates an image from the received data, intermediate outputs from each of the plurality of microwave transceivers are stacked vertically to form rows of an image, and columns of the image display time varying outputs of the received data.

18. The system of claim 17, wherein the plurality of microwave transceivers are powered up sequentially, reach a steady state before being sampled and switched off before a next transceiver is powered up.

* * * * *